US007664497B2

(12) United States Patent
Willey et al.

(10) Patent No.: US 7,664,497 B2
(45) Date of Patent: Feb. 16, 2010

(54) APPARATUS AND METHOD OF TIMER-BASED REGISTRATION IN A MOBILE RADIO NETWORK

(75) Inventors: William Daniel Willey, San Francisco, CA (US); Khaledul M. Islam, Ottawa (CA); Hao Xue, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 459 days.

(21) Appl. No.: 11/272,049

(22) Filed: Nov. 14, 2005

(65) Prior Publication Data

US 2006/0121899 A1 Jun. 8, 2006

Related U.S. Application Data

(63) Continuation of application No. PCT/CA2004/000736, filed on May 14, 2004.

(30) Foreign Application Priority Data

May 14, 2003 (EP) ................... 03252986

(51) Int. Cl.
   *H04W 4/00* (2006.01)
(52) U.S. Cl. ............ 455/435.1; 455/434; 455/574; 455/343.3; 455/343.4; 455/343.2
(58) Field of Classification Search ............ 455/434, 455/435.1, 522, 574, 343.2–343.5
   See application file for complete search history.

(56) References Cited

U.S. PATENT DOCUMENTS

| 4,775,999 | A | * | 10/1988 | Williams | ............. 455/435.1 |
|---|---|---|---|---|---|
| 5,097,499 | A | * | 3/1992 | Cosentino | ............. 455/435.1 |
| 5,574,728 | A |   | 11/1996 | Mamaghani | |
| 5,588,043 | A |   | 12/1996 | Tiedemann | |
| 5,629,975 | A | * | 5/1997 | Tiedemann et al. | ...... 455/435.1 |
| 5,642,398 | A | * | 6/1997 | Tiedemann et al. | ...... 455/426.1 |
| 5,701,592 | A | * | 12/1997 | Kallin et al. | ............. 455/69 |

(Continued)

FOREIGN PATENT DOCUMENTS

WO   01/52589 A1   7/2001

OTHER PUBLICATIONS

Zhuyu Lei et al, "Probability Criterion Based Location Tracking Approach for Mobility Management of Personal Communications Systems", Global Telecommunications Conference 1997, Nov. 3, 1997, pp. 977-981, XP010254677, IEEE, New York, NY.

(Continued)

*Primary Examiner*—Charles N Appiah
*Assistant Examiner*—Olumide T Ajibade Akonai
(74) *Attorney, Agent, or Firm*—Heenan Blaikie LLP

(57) ABSTRACT

A method of timer-based registration prevents timer-based registrations that are not needed from being sent. A history is maintained of time instances of implicit registrations transmitted by a mobile station over a communications network. If an elapsed time between a pair of successive ones of the time instances in the history is not less than a registration period with the network, a timer-based registration of the mobile station with the communications network is initiated after the expiry of a random time value less than the registration period. Otherwise, a timer-based registration is initiated after the expiry of a time period equal to the registration period.

35 Claims, 12 Drawing Sheets

U.S. PATENT DOCUMENTS

| | | | |
|---|---|---|---|
| 5,862,482 A | | 1/1999 | Beesley |
| 5,953,652 A | * | 9/1999 | Amin et al. ................. 455/410 |
| 5,978,669 A | * | 11/1999 | Sanmugam ................. 455/410 |
| 6,119,017 A | * | 9/2000 | Cassidy et al. ............. 455/518 |
| 6,360,097 B1 | * | 3/2002 | Smith et al. ................ 455/434 |
| 6,385,448 B1 | * | 5/2002 | Beckman et al. ......... 455/435.1 |
| 6,411,816 B1 | * | 6/2002 | McDonald et al. .......... 455/518 |
| 6,745,031 B2 | * | 6/2004 | Chun et al. .............. 455/435.1 |
| 6,778,829 B1 | * | 8/2004 | McDonald et al. ....... 455/435.1 |
| 7,155,222 B1 | * | 12/2006 | Jain et al. ............... 455/435.1 |
| 7,283,819 B2 | * | 10/2007 | Jiao et al. ............... 455/435.1 |
| 7,369,849 B2 | * | 5/2008 | Fraser et al. ............ 455/435.1 |
| 2002/0045466 A1 | | 4/2002 | Teranishi |

OTHER PUBLICATIONS

Hyoung-Kyu Lim et al, "A Timer-based Multilayer Location Management Strategy for PCS Networks", 6th International Conference on Universal Personal Communications Record, Oct. 12, 1997, pp. 141-145, XP010248686, IEEE, New York, NY.

* cited by examiner

APPARATUS AND METHOD OF TIMER-BASED REGISTRATION IN A MOBILE RADIO NETWORK

CROSS REFERENCE TO RELATED APPLICATIONS

This application is a continuation of International Patent Application PCT/CA2004/000736, entitled Apparatus and Method of Timer-Based Registration in a Mobile Radio Network, filed May 14, 2004, and claims priority from European Patent Application 03252986.9, filed May 14, 2003, the contents of which are incorporated herein by reference.

FIELD OF THE INVENTION

This application relates to mobile communication techniques in general, and to an apparatus and method of timer-based registration, in particular.

BACKGROUND OF THE INVENTION

The conventional timer-based registration technique in the latest CDMA standard (C.S0001-C, C.S0002-C, C.S0003-C, C.S0004-C, and C.S0005-C, all available on the 3GPP2 website, http://www.3gpp2.org) was designed with voice calls in mind. The current method uses a timer that guarantees that there is a minimum time between registrations (configured by the operator). Guaranteeing a minimum time between registrations allows the infrastructure to automatically deregister a mobile station if it detects that the mobile station has not sent a registration. When the timer expires the mobile registers. The current technique also includes a randomization scheme. According to the randomization scheme, after a call the mobile applies a random offset to the timer. When the random offset is applied, the time before the next registration is reduced by a random amount. If a large number of users end their phone calls at the same time, the randomization scheme causes the timer-based registrations of the users to be randomized when they would otherwise all happen at the same time.

When this technique is used by a data device that makes a large number of data calls, this may result in wasted battery life. For example, if higher layer applications are causing data calls to happen frequently enough, timer-based registrations may not be needed at all; with the conventional method random timer-based registrations are generated, which may waste both battery life in the mobile and capacity of the cellular network.

SUMMARY OF THE INVENTION

According to a first aspect of the invention, there is provided a method of timer-based registration at a mobile station. In accordance with the method, a history is maintained of time instances of implicit registrations transmitted by a mobile station over a communications network. The history may be maintained at the mobile station. If an elapsed time between a pair of successive ones of the time instances in the history is not less than a registration period with the network, a timer-based registration of the mobile station with the communications network is initiated after the expiry of a random time value less than the registration period. Otherwise, the timer-based registration is initiated after the expiry of a time period equal to the registration period.

In one implementation, the step of initiating a timer-based registration further involves initiating the timer-based registration after the expiry of the random time value if a duration of a communication with the mobile station over the communications network was long (eg. at least twice the registration period) relative to the registration period. The step of initiating a timer-based registration may also involve initiating the timer-based registration after the expiry of the time period if a duration of a communication with the mobile station over the communications network exceeds the registration period.

The history of time instances may be maintained by (a) recording in the history a new time entry comprising the time instance of a last one of the implicit registrations, and (b) where a duration of a communication with the mobile station over the communications network is greater than the registration period, (i) calculating an incremental time comprising the registration period greater than the time of the new time entry, and (ii) recording in the history an additional time entry comprising the incremental calculated time. The step of recording a new time entry may involve the step of: over the new time entry recording the time instance of a new one of the implicit registrations, where a time lag between the time instance of the implicit registration preceding the last one implicit registration and the time instance of the new one implicit registration is less than the registration period.

Further, the step of initiating a timer-based registration after the expiry of a random time value may also involve the steps of receiving a network parameter at the mobile station, and generating the random time value based on the received network parameter. The step of generating the random time value may comprise the steps of calculating a pseudo-random number from a cyclic pseudo-random number generator, and applying a time offset to the calculated pseudo-random number based on the received network parameter.

According to a second aspect of the invention, there is provided a timer-based registration apparatus at a mobile station. The apparatus includes a registration timer, a history buffer, maintaining means for maintaining in the history buffer a history of time instances of implicit registrations transmitted by the mobile station over a communications network, and setting means for setting an initial count value in the registration timer. The count value is set to a random time value less than a registration period with the network if an elapsed time between a pair of successive ones of the time instances in the history is not less than the registration period. Otherwise, the count value is set to a time period equal to the registration period. The apparatus also includes registration means for initiating registration of the mobile station with the communications network upon expiry of the registration timer According to a third aspect of the invention, there is provided a method of timer-based registration at a mobile station. The mobile station receives a randomization parameter over a communications network, and assigns to a registration timer a random count value determined in accordance with the received randomization parameter. The mobile station initiates a registration of the mobile station with the communications network upon expiry of the registration timer.

In one implementation, the assigning step may involve the steps of calculating a pseudo-random number from a cyclic pseudo-random number generator, and applying a time offset to the calculated pseudo-random number based on the received randomization parameter.

According to a fourth aspect of the invention, there is provided a timer-based registration apparatus at a mobile station. The apparatus includes a registration timer, receiving means for receiving a randomization parameter over a communications network, and assigning means for calculating a random count value based on the received randomization parameter, and for assigning the calculated random count value to the registration timer. The apparatus also includes registration means for initiating registration of the mobile station with the communications network upon expiry of the registration timer.

Other aspects and features of the invention will become apparent to those ordinarily skilled in the art upon review of the following description.

BRIEF DESCRIPTION OF THE DRAWINGS

Embodiments of the invention will now be described, by way of example only, with reference to the attached figures, wherein.

Same reference numerals are used in different figures to denote similar elements.

DETAILED DESCRIPTION OF THE PREFERRED EMBODIMENTS

Figure 1:
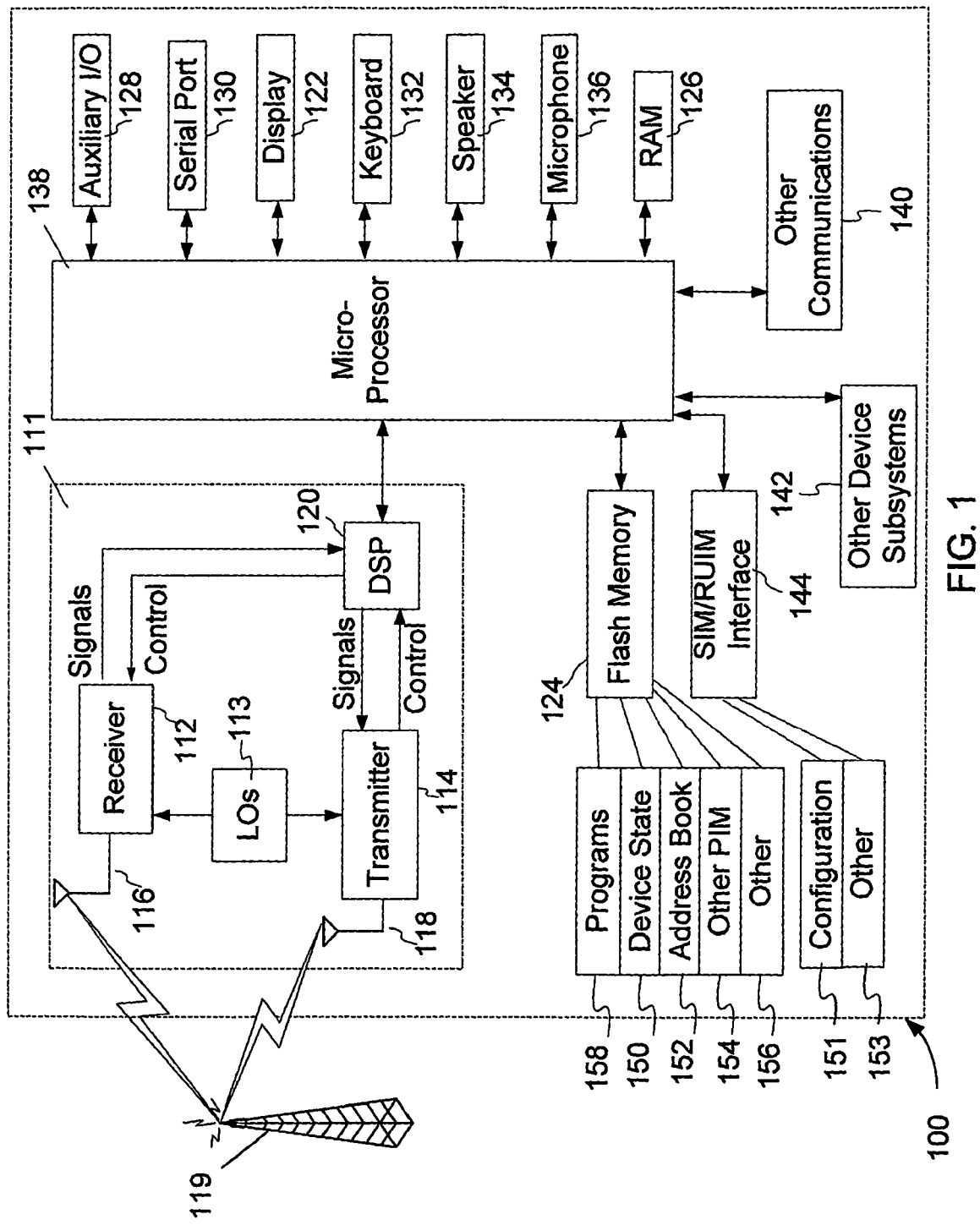
FIG. 1 is a block diagram illustrating a conventional mobile station that can be adapted to include preferred embodiments of the invention.

Referring to the drawings, FIG. 1 is a block diagram illustrating a conventional mobile station that can be adapted to include preferred embodiments of the invention. Mobile station 100 is preferably a two-way wireless communication device having at least voice and data communication capabilities. Mobile station 100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, mobile station 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, mobile station 100 is registered on the network using a unique identification number associated with each mobile station. In UMTS and GPRS networks, and in some CDMA networks, however, network access is associated with a subscriber or user of mobile station 100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 100 will be unable to carry out any other functions involving communications over the network 100. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation methods have been completed, mobile station 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 1, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Mobile station 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, flash memory 124 can be segregated into different areas for both computer programs 158 and program data storage 150, 152, 154 and 156. These different storage types indicate that each program can allocate a portion of flash memory 124 for their own data storage requirements. Microprocessor 138, in addition to its operating system functions, preferably enables execution of software applications on the mobile station. A predetermined set of applications that control basic operations, including at least data and voice communication applications for example, will normally be installed on mobile station 100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the mobile station user's corresponding data items stored or associated with a host computer system. Further applications may also be loaded onto the mobile station 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the mobile station 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of mobile station 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of mobile station 100 is similar, except that received signals would preferably be output to a speaker 134 and signals for transmission would be generated by a microphone 136. Alternative voice or audio I/O subsystems, such as a voice message recording subsystem, may also be implemented on mobile station 100. Although voice or audio signal output is preferably accomplished primarily through the speaker 134, display 122 may also be used to provide an indication of the identity of a calling party, the duration of a voice call, or other voice call related information for example.

Serial port 130 in FIG. 1, would normally be implemented in a personal digital assistant (PDA)-type mobile station for which synchronization with a user's desktop computer (not shown) may be desirable, but is an optional device component. Such a port 130 would enable a user to set preferences through an external device or software application and would extend the capabilities of mobile station 100 by providing for information or software downloads to mobile station 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between mobile station 100 and different systems or devices, which need not necessarily be similar devices. For example, the subsystem 140 may include an infrared device and associated circuits and components or a Bluetooth™ communication module to provide for communication with similarly enabled systems and devices.

Figure 2:
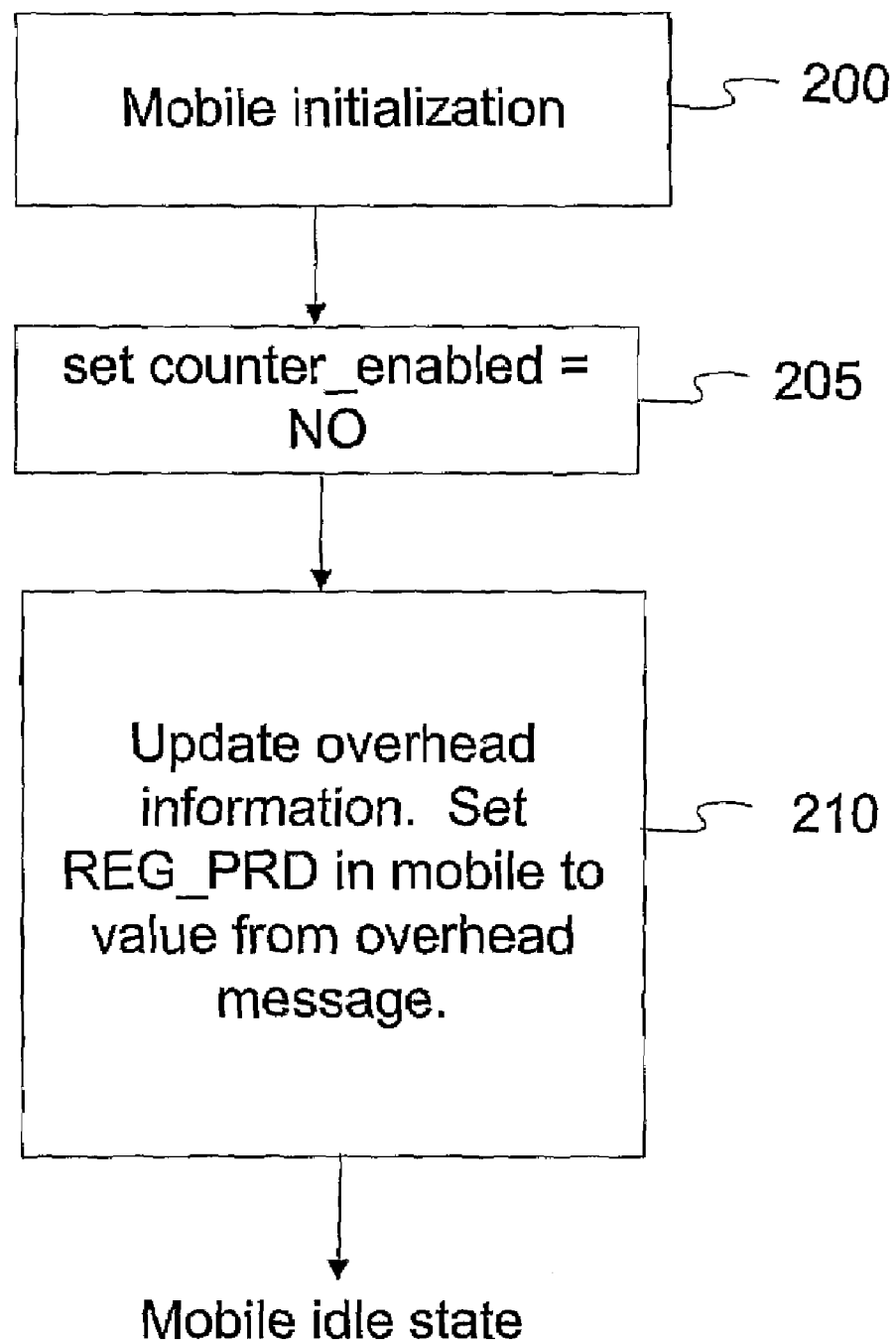
FIG. 2 is a flow chart illustrating a conventional mechanism for initializing timer-based registration parameters in a CDMA mobile station.

Turning now to FIG. 2, FIG. 2 is a flow chart illustrating a conventional mechanism for initializing timer-based registration parameters in a CDMA mobile station. At step 200 the mobile station begins the mobile initialization. Processing continues at step 205 where a Boolean variable, counter_enabled is set to NO. counter_enabled indicates whether or not the counter, which is used to measure the time until a timer-based registration is performed, is enabled. Processing continues at step 210 where the mobile station updates the overhead information by receiving the overhead messages from the Paging Channel or the Broadcast channel. The mobile station sets the value REG_PRD to the value received in the overhead message. REG_PRD indicates the time between timer-based registrations.

Figure 3:
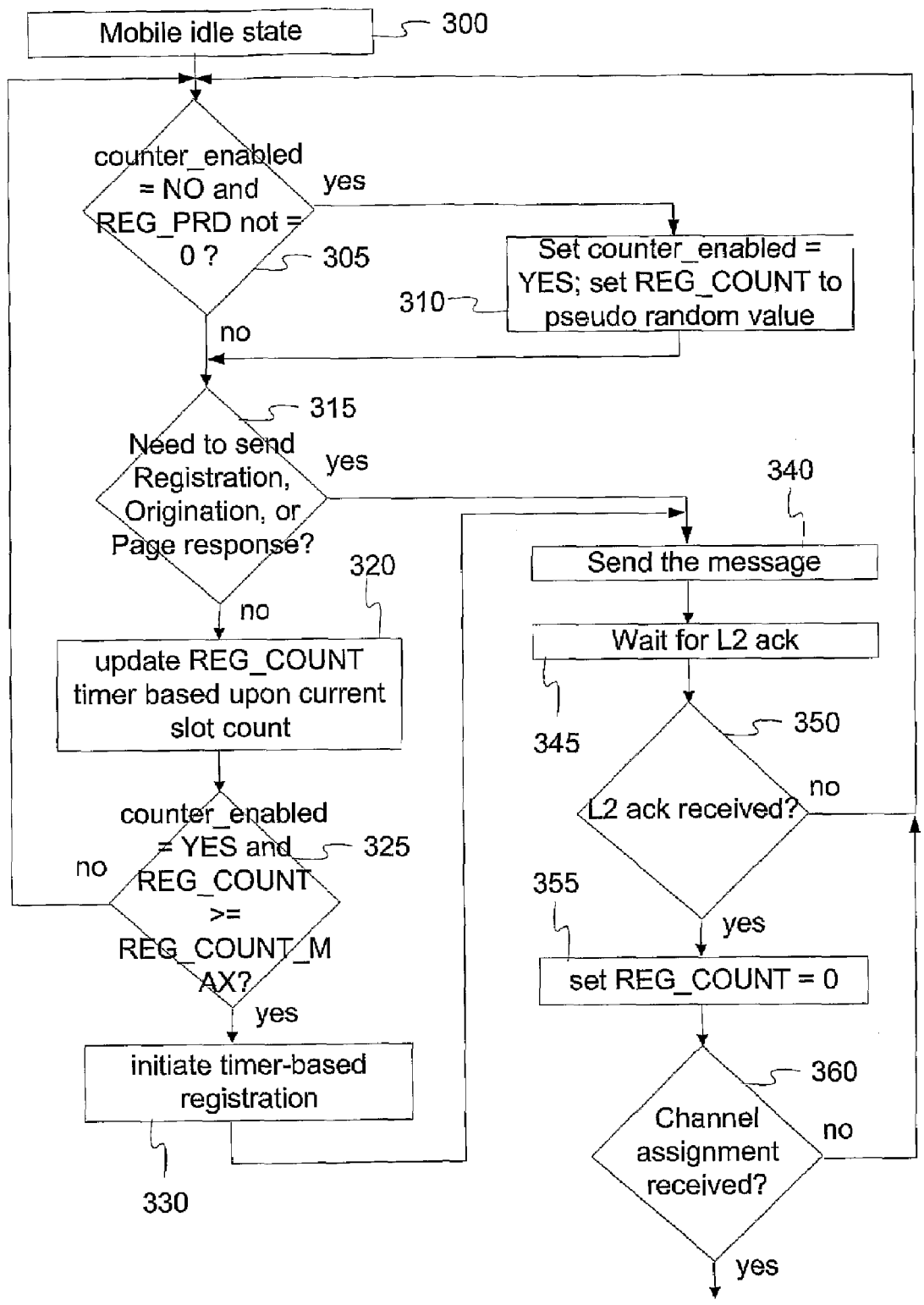
FIG. 3 is a flow chart illustrating processing in the mobile station idle state associated with conventional timer-based registration in a CDMA mobile station.
Figure 4:
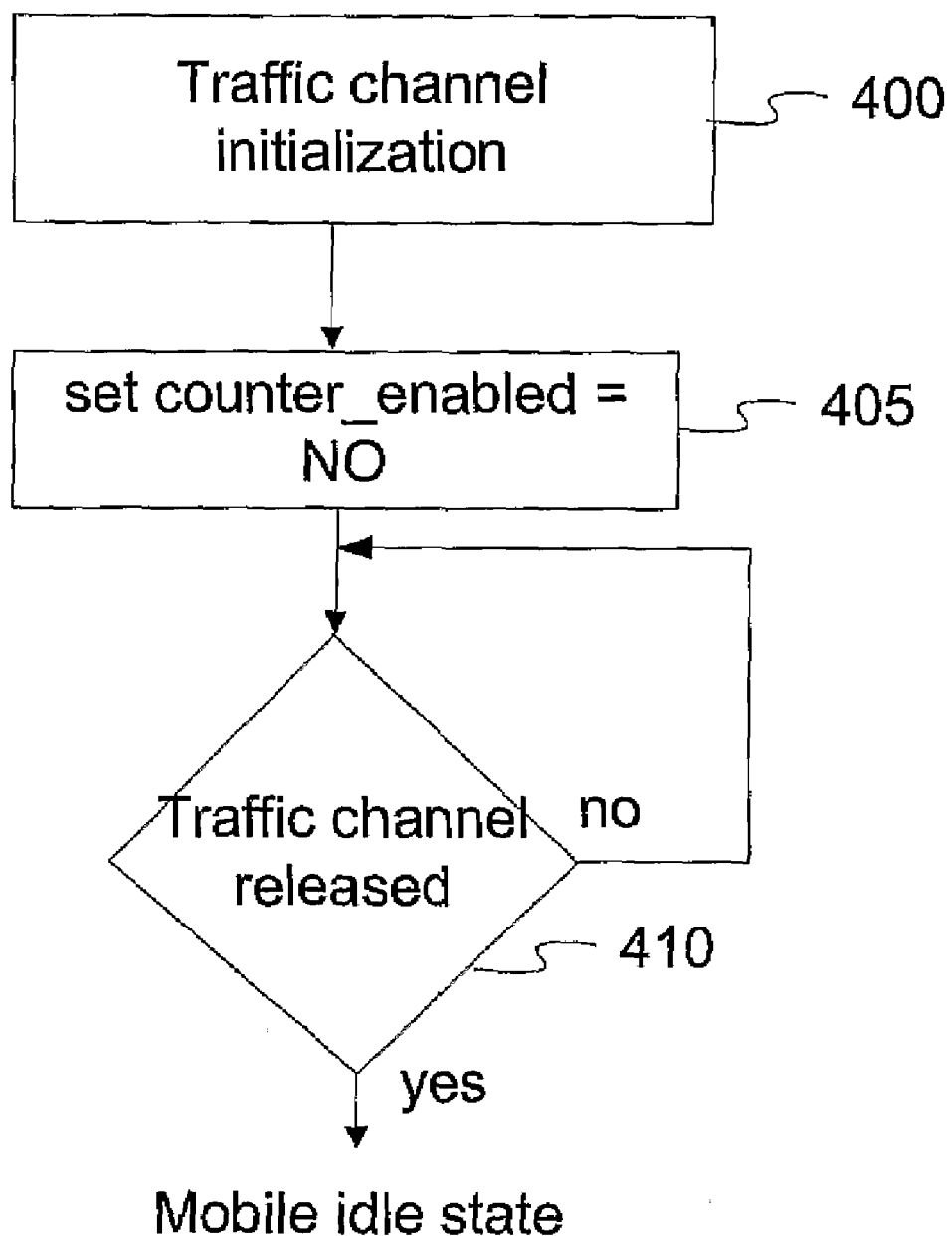
FIG. 4 is a flow chart illustrating processing in the traffic channel initialization state associated with conventional timer-based registration in a CDMA mobile station.

Turning to FIG. 3, FIG. 3 is a flow chart illustrating processing in the mobile station idle state associated with conventional timer-based registration in a CDMA mobile station. The method starts at step 300 where the mobile station enters the mobile station idle state. Processing continues at decision step 305 where the mobile checks to see if counter_enabled is set to NO and REG_PRD is not equal to 0. If REG_PRD is equal to 0, that means that timer-based registration is not enabled. If the result of decision step 305 is positive, processing continues at step 310. If the result of decision step 305 is negative, processing continues at decision step 315. At step 310 the mobile station sets counter_enabled equal to YES and sets REG_COUNT to a pseudo-random value between 0 and the maximum time between timer-based registrations. After step 310, processing continues at decision step 315. At step 315 the mobile station determines if it needs to send a Registration Message, Origination Message, or a Page Response Message. If the result of decision step 315 is positive, processing continues at step 340. If the result of decision step 315 is negative, processing continues at step 320. At step 340 the mobile sends the message; processing then continues at step 345 where the mobile waits for a Layer 2 acknowledgement. Processing then continues at decision step 350. At decision step 350, the mobile checks to see if a Layer 2 acknowledgement was received. If the result of decision step 350 is negative, processing continues at decision step 305. If the result of decision step 350 is positive, processing continues at step 355. At step 355 the mobile sets REG_COUNT=0; this sets the timer-based registration timer to trigger a timer-based registration if there is no registration (implicit or explicit) before the timer-based registration timer expires. After step 355, processing continues at decision step 360. At decision step 360 the mobile checks to see if a Channel Assignment has been received. If the result of decision step 360 is negative, processing continues at decision step 305. If the result of decision step 360 is positive, processing continues with Traffic channel initialization as shown in FIG. 4. At step 320 the mobile updates the REG_COUNT timer based upon the current slot count as described in C.P0005-C. After step 320, processing continues at decision step 325. At decision step 325 the mobile checks to see if counter_enabled is equal to YES and if REG_COUNT is greater than or equal to REG_COUNT_MAX (i.e. the mobile checks to see if the maximum amount of time between registrations has passed and if it is time to send a timer-based registration.) If the result of decision step 325 is negative, then processing continues at decision step 305. If the result of decision step 325 is positive, then the mobile initiates timer-based registration in step 330 and then processing continues at step 340.

Referring to FIG. 4, FIG. 4 is a flow chart illustrating processing in the traffic channel initialization state associated with conventional timer-based registration in a CDMA mobile station. Processing begins at step 400. Processing continues at step 405 where counter_enabled is set to NO. Processing then continues at step 410 where the mobile waits until the traffic channel has been released. After the traffic channel has been released, the mobile goes to the mobile idle state shown in FIG. 3.

Figure 5:
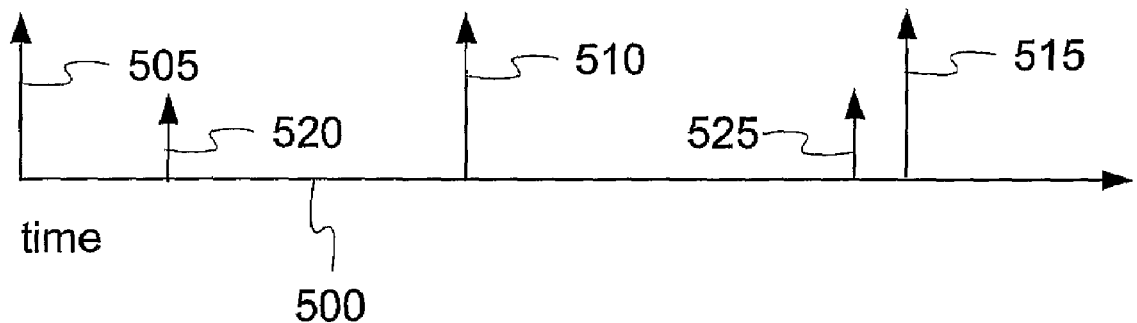
FIG. 5 illustrates the conventional timing of originations and timer-based registrations in a CDMA mobile station.
Figure 5:
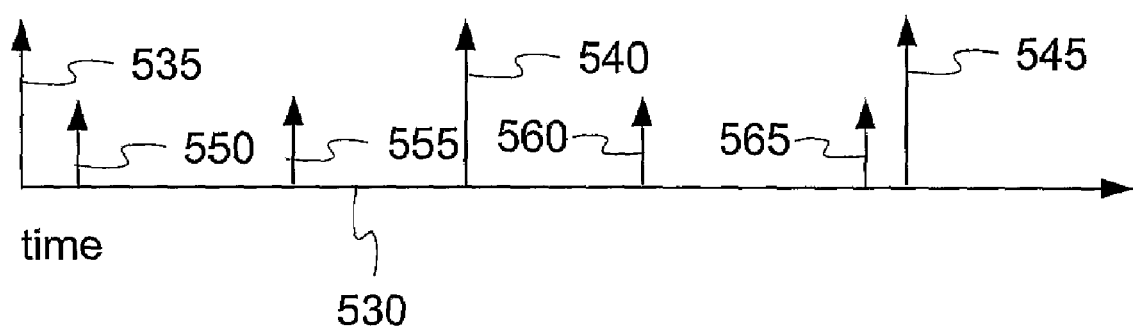

Referring now to FIG. 5, FIG. 5 illustrates the conventional timing of originations and timer-based registrations in a CDMA mobile station. Timeline 500 shows the timings of registrations and originations where originations are sent at a periodic rate that is the same as the maximum time between timer-based registrations. 505, 510, and 515 all represent Originations being sent; the calls that result are all short in duration. The time between 505 and 510 and the time between 510 and 515 are both equal to the maximum time between timer-based registrations. 520 and 525 both represent timer-based registrations. Note that both 520 and 525 are both pseudo-randomly generated and are after the end of short calls. Since Originations 505, 510, and 515 are all implicit registrations that do not exceed the maximum time between timer-based registrations, timer-based registrations 520 and 525 are both unnecessary, wasting the battery life of the mobile and wasting capacity in the cellular network. Timeline 530 shows the timings of registrations and originations where originations are sent at a periodic rate that is equal to twice the maximum time between timer-based registrations. 535, 540, and 545 all represent Originations being sent; the calls that result are all short in duration. The time between 535 and 540 and the time between 540 and 545 are both equal to twice the maximum time between timer-based registrations. 550, 555, 560, and 565 all represent timer-based registrations. Note that timer-based registrations 550 and 560 are both pseudo-randomly generated and are after the end of short calls. Also note that timer based registrations 555 and 565 occur at a time after timer-based registrations 550 and 560, respectively, equal to the maximum time between timer-based registrations. If it were not for the pseudo-random offset, registration 550 would have happened halfway between originations 535, 540 and registration 560 would have happened halfway between originations between 540 and 545, making registrations 555 and 565 unnecessary and a waste of the mobiles battery life and a waste of capacity of the cellular network.

Figure 6:
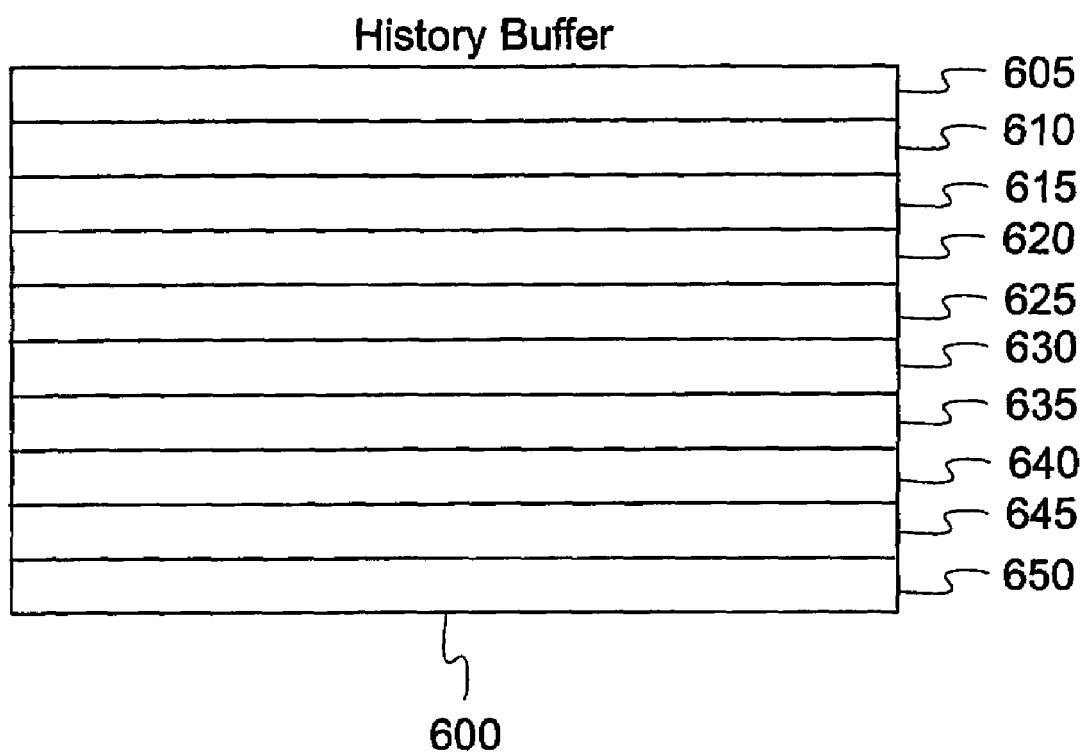
FIG. 6 illustrates an example of a History Buffer in a CDMA mobile station, provided in accordance with an embodiment of the invention.

Turning to FIG. 6, FIG. 6 illustrates an example of a History Buffer in a CDMA mobile station, provided in accordance with an embodiment of the invention. History Buffer 600 is a data structure in the memory 126 of mobile station 100. History Buffer 600 could be an array, for example. Each entry in History Buffer 600 represents a time. The time could be the 36-bit CDMA system time, for example, or the time could be the 32 least significant bits of the CDMA system time. FIG. 6 shows 10 entries in the history buffer, though it could have more or fewer entries. When the mobile station is initialised, all entries in the history buffer are set to a suitable NULL value such as 0. 605 is the newest entry in the history buffer 600. The remaining entries in the history buffer are listed in order from newest to oldest as follows: 610, 615, 620, 625, 630, 635, 640, 645, and 650. Typically when a new time is added to the history buffer 600, the oldest time (i.e. entry 650) is deleted, then the other entries are shifted in the array to make room for the newest entry. For example, the contents of 645 copied to 650, then 640 copied to 645, and so on. The new time is then placed in entry 605. The history buffer 600 is used to store the times of Origination Messages and Page Response Messages.

Figure 7:
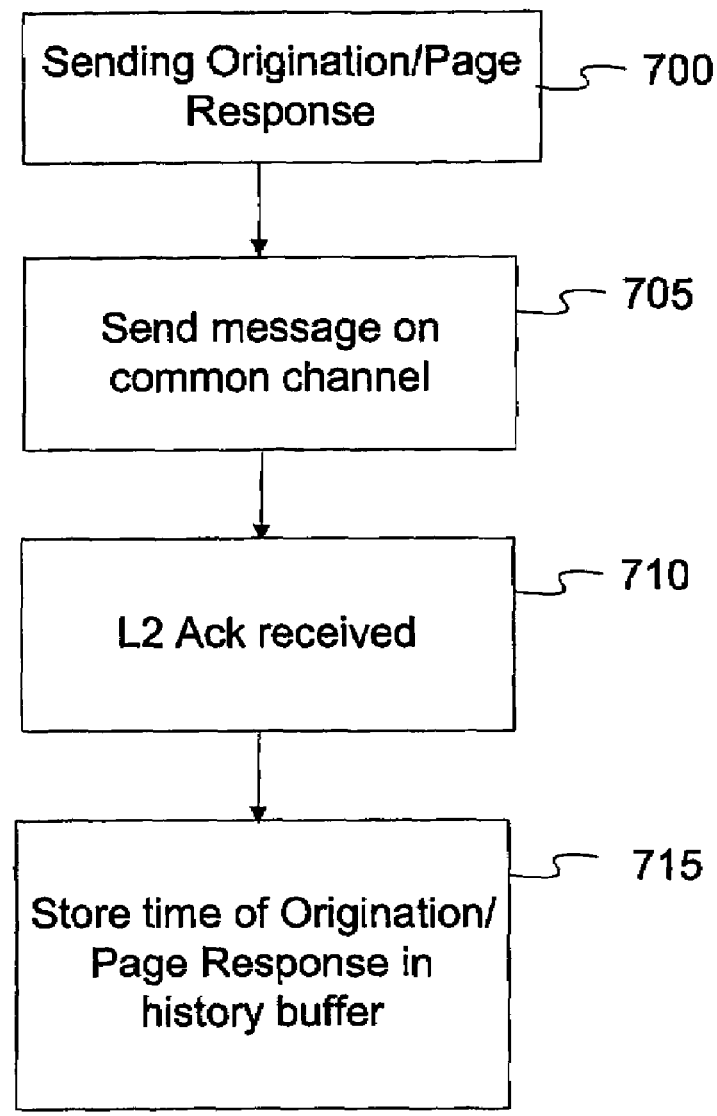
FIG. 7 is a flow chart illustrating processing associated with the sending of Origination and Page Response messages, provided in accordance with an embodiment of the invention.

Referring now to FIG. 7, FIG. 7 is a flow chart illustrating processing associated with the sending of Origination and Page Response messages, provided in accordance with an embodiment of the invention. According to the method, the times of the Origination or Page response messages are stored in history buffer 600. Processing begins at step 700 and then continues at step 705 where the mobile station sends the message on the common channel. Processing then continues at step 710 where a Layer 2 acknowledgement is received. Processing then continues at step 715. At step 715 the mobile station stores the time of the origination or page response in the history buffer 600. It should be noted that if the difference between the time of the current origination or page response and the one before the newest entry (i.e. entry 610) in the history buffer 600 is less than the maximum time between timer-based registrations, it is preferable to replace the newest entry in the history buffer 600 with the time of the current origination or page response; this avoids the need for a larger history buffer to store a suitably large number of originations and page responses. Otherwise the oldest entry in the history buffer 600 is removed and the newest entries are shifted and the time of the current origination or page response is put in the newest entry (i.e. entry 610) in the history buffer 600.

Figure 8:
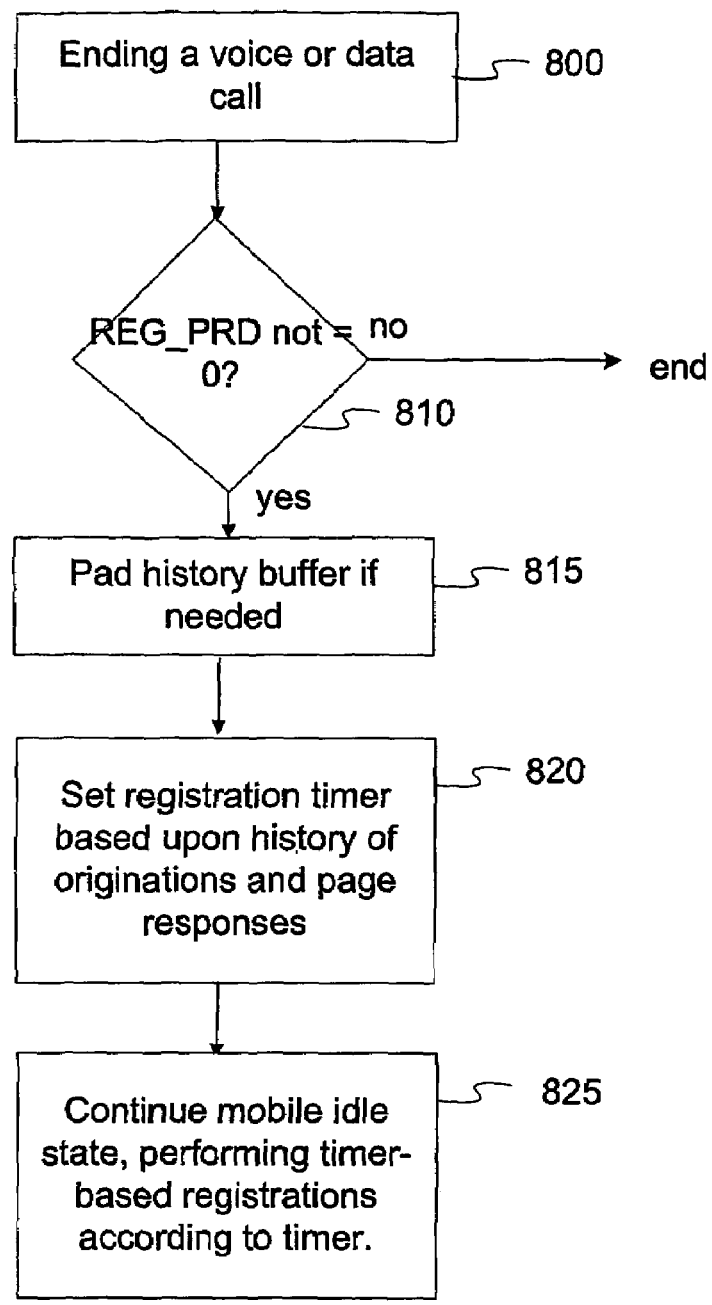
FIG. 8 is a flow chart illustrating processing associated with the ending of a voice or data call, provided in accordance with an embodiment of the invention.
Figure 9:
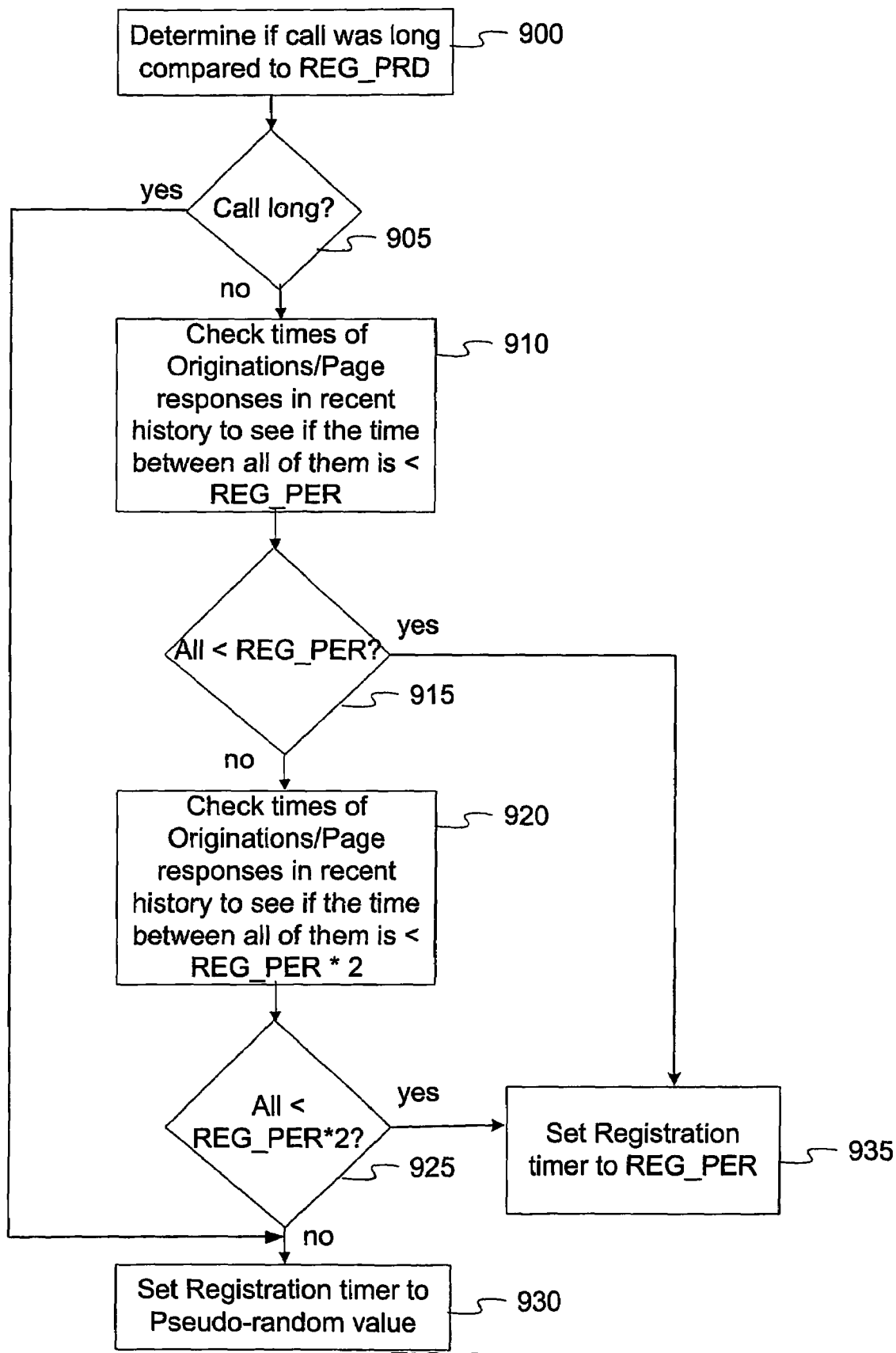
FIG. 9 is a flow chart illustrating a method for setting a registration timer based upon a history of originations and page responses, provided in accordance with an embodiment of the invention.

Referring to FIG. 8, FIG. 8 is a flow chart illustrating processing associated with the ending of a voice or data call, provided in accordance with an embodiment of the invention. Processing begins at step 800 and continues at decision step 810. At decision step 810 the mobile station checks to see if REG_PRD is not equal to 0. If the result of decision step 810 is negative, processing ends (timer-based registration is disabled in this case). If the result of decision step 810 is positive then processing continues at step 815. At step 815, the mobile station pads the history buffer if needed. The reason for padding the history buffer is so that a call that is longer than the maximum timer-based registration period is not evaluated in such a way as to appear as a lack of calls when measuring the times of originations and page responses in the history buffer 600. For example, suppose that at the end of the call, the current time subtracted from the time of the newest entry in the history buffer is slightly more than the maximum time between timer-based registrations. In this case a newest entry is added to the history buffer that is the maximum timer-based registration period greater than the prior newest entry in the history buffer. For longer calls, successive newer entries can be added by again adding the maximum time between timer-based registrations to the newest entry in the history buffer 600; entries are added in such a way as to avoid the time gap that would otherwise be there due to the long call. Processing then continues at step 820. At step 820 the mobile station sets the registration timer (i.e. the time until the next timer-based registration) according to the content of the history buffer 600. FIG. 9 shows the setting of the registration timer in greater detail. After step 820 processing continues at step 825 where the mobile in the idle state continues performing timer-based registrations.

Turning to FIG. 9, FIG. 9 is a flow chart illustrating a method for setting a registration timer based upon a history of originations and page responses, provided in accordance with an embodiment of the invention. Processing begins at step 900 where the mobile station determines if the call was long compared to the registration period REG_PRD. For example, the mobile station could determine that the call was long compared to REG_PRD if the call was more than twice as long as REG_PRD. Processing continues at decision step 905 where the mobile station checks if the call was long. If the call was long, processing continues at step 930; otherwise processing continues at step 910. At step 930 the registration timer is set to a pseudo-random value between 0 and the maximum time between timer-based registrations, REG_PER (REG_PER and REG_PRD are both indications of the registration period, but measured using different time increments). At step 910 the mobile station checks the times of Originations and Page responses in recent history (i.e. the recent entries in the history buffer) to see if the time between all of them is <REG_PER, the maximum time between timer-based registrations. When the mobile station performs this check, it preferably does not use all entries in the history buffer; it preferably uses a number of the newest entries. For example, the mobile station can check the five newest entries in the history buffer and verify that the time between no two adjacent entries of the five is greater than the maximum time between timer-based registrations. Processing then continues at decision step 915 where the mobile checks if the time difference between each pair of checked adjacent entries in the history buffer is less than the maximum time between timer-based registrations. If the result of decision step 915 is positive, processing continues at step 935 where the registration timer is set to the maximum time between registrations; otherwise processing continues at step 920. Step 920 is similar to step 910, but step 920 uses the entire history buffer and step 920 is comparing the times to a value which is twice the maximum time between registrations. At step 920 the mobile station checks the times of Originations and Page responses in recent history (i.e. the recent entries in the history buffer) to see if the time between all of them is <REG_PER*2, or twice the maximum time between timer-based registrations. When the mobile station performs this check, it preferably checks the entire history buffer. The mobile station can check all entries in the history buffer and verify that the time between no two adjacent entries is greater than the maximum time between timer-based registrations. Processing then continues at decision step 925 where the mobile checks if the time difference between each pair of checked adjacent entries in the history buffer is less than twice the maximum time between timer-based registrations. If the result of decision step 925 is positive, processing continues at step 935 where the registration timer is set to the maximum time between registrations; otherwise processing continues at step 930.

Figure 10:
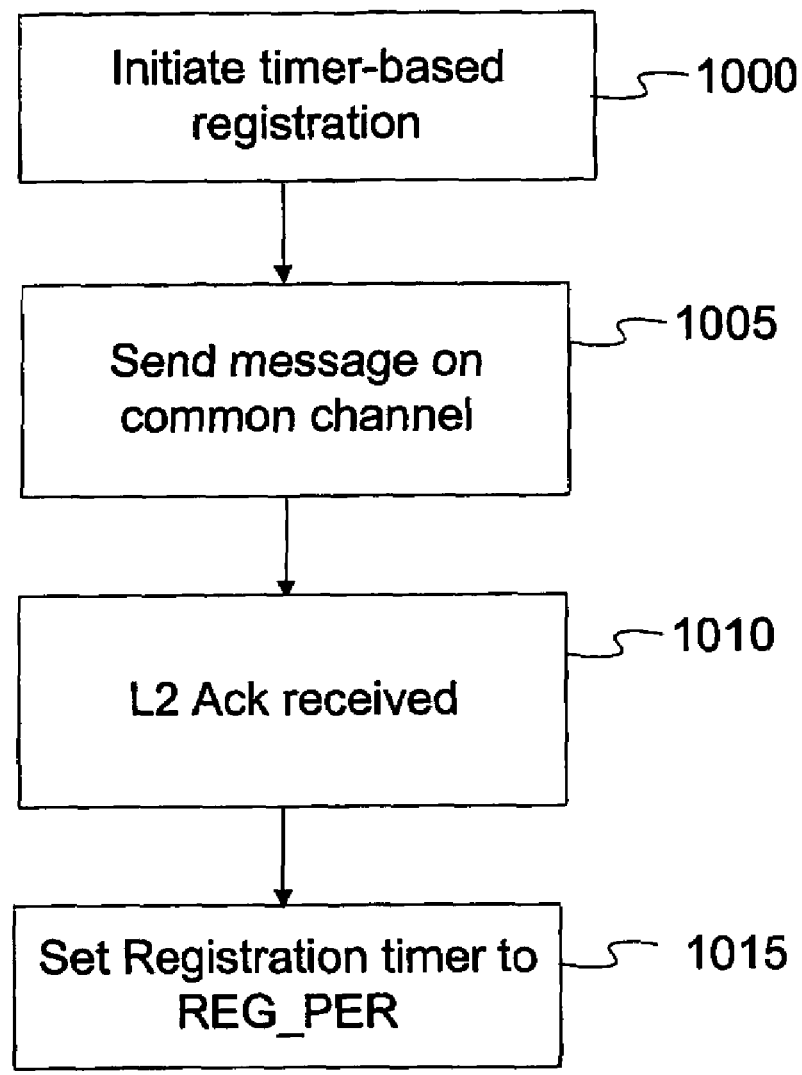
FIG. 10 is a flow chart illustrating the sending of a timer-based registration message, provided in accordance with an embodiment of the invention.

Referring now to FIG. 10, FIG. 10 is a flow chart illustrating the sending of a timer-based registration message, provided in accordance with an embodiment of the invention. Processing starts at step 1000 where the timer-based registration is initiated. Processing then continues at step 1005 where the mobile station sends the message on the common channel. Processing then continues at step 1010 where a Layer 2 acknowledgement is received. Processing then continues at step 1015 where the registration timer is set to REG_PER.

Figure 11:
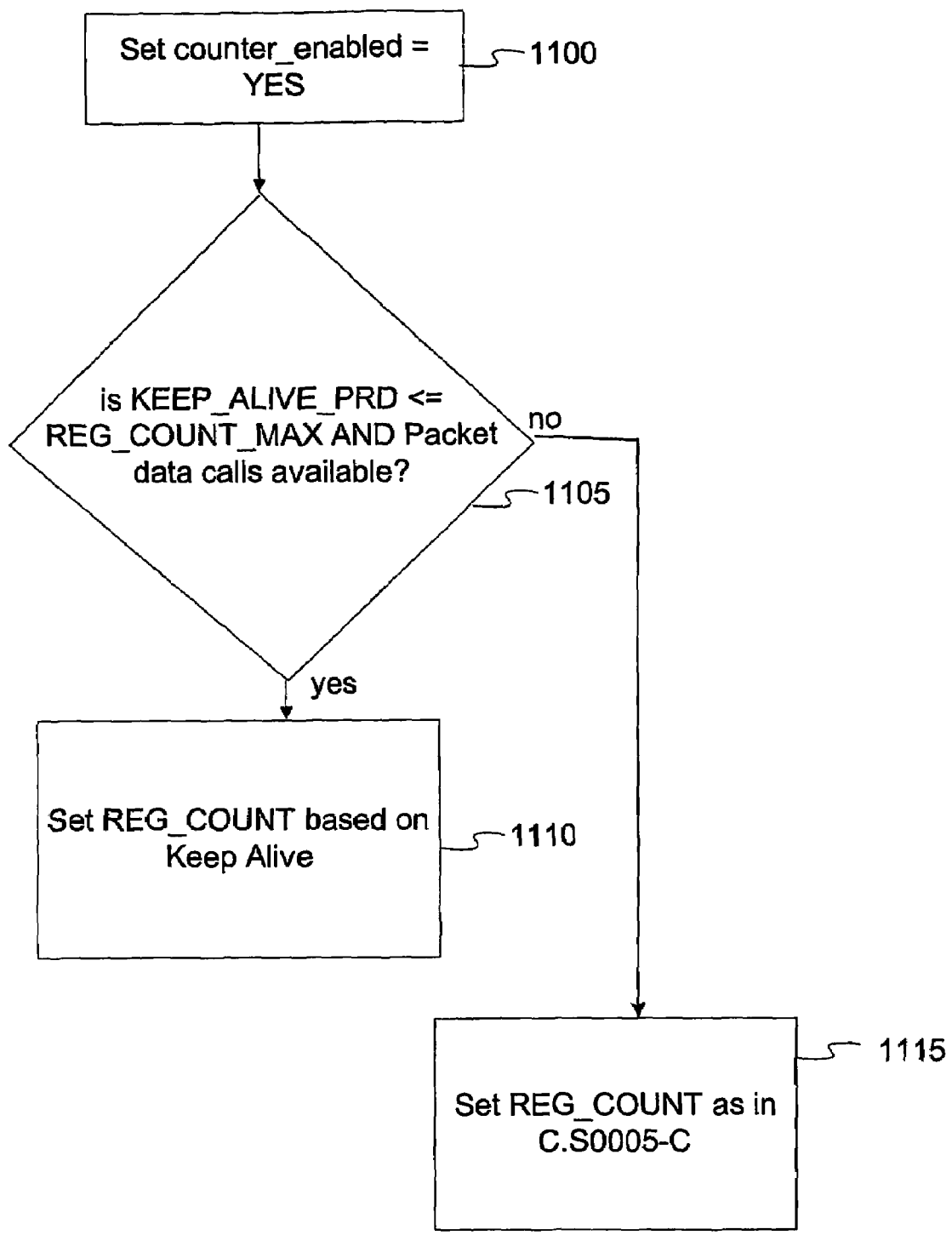
FIG. 11 is a flow chart illustrating how to set REG_COUNT, provided in accordance with an embodiment of the invention.

Turning to FIG. 11, FIG. 11 is a flow chart illustrating how to set REG_COUNT, provided in accordance with an embodiment of the invention. The mobile station may have applications that require periodic data calls. One example of such an application is a Simple IP keep alive application that generates periodic data calls. When Mobile IP is being used, the Registration Lifetime field from the Agent Advertisement causes periodic data calls to be initiated where the Keep alive period is the registration lifetime. The method in FIG. 11 is an alternative to step 310 of FIG. 3. At step 1100 the mobile sets counter_enabled=YES; processing then continues at decision step 1105 where the mobile station checks if KEEP_ALIVE_PRD is less than or equal to the maximum time between timer-based registrations and checks if packet data calls are available. If the result of step 1105 is negative, processing continues at step 1115 where REG_COUNT is set according to C.S0005-C. If the result of step 1105 is positive then REG_COUNT is set based upon a keep alive value. REG_COUNT is set according to the following formula:

$$z_n = (a \times z_{n-1}) \bmod m \text{ with } z_0 = (\text{ESN} \oplus \text{RANDOM\_TIME}) \bmod m \; R_n = \lfloor ((\text{REG\_COUNT\_MAX} - \text{KEEP\_ALIVE\_PRD}) \times z_n)/m \rfloor \text{REG\_COUNT} = R_n,$$

Figure 12:
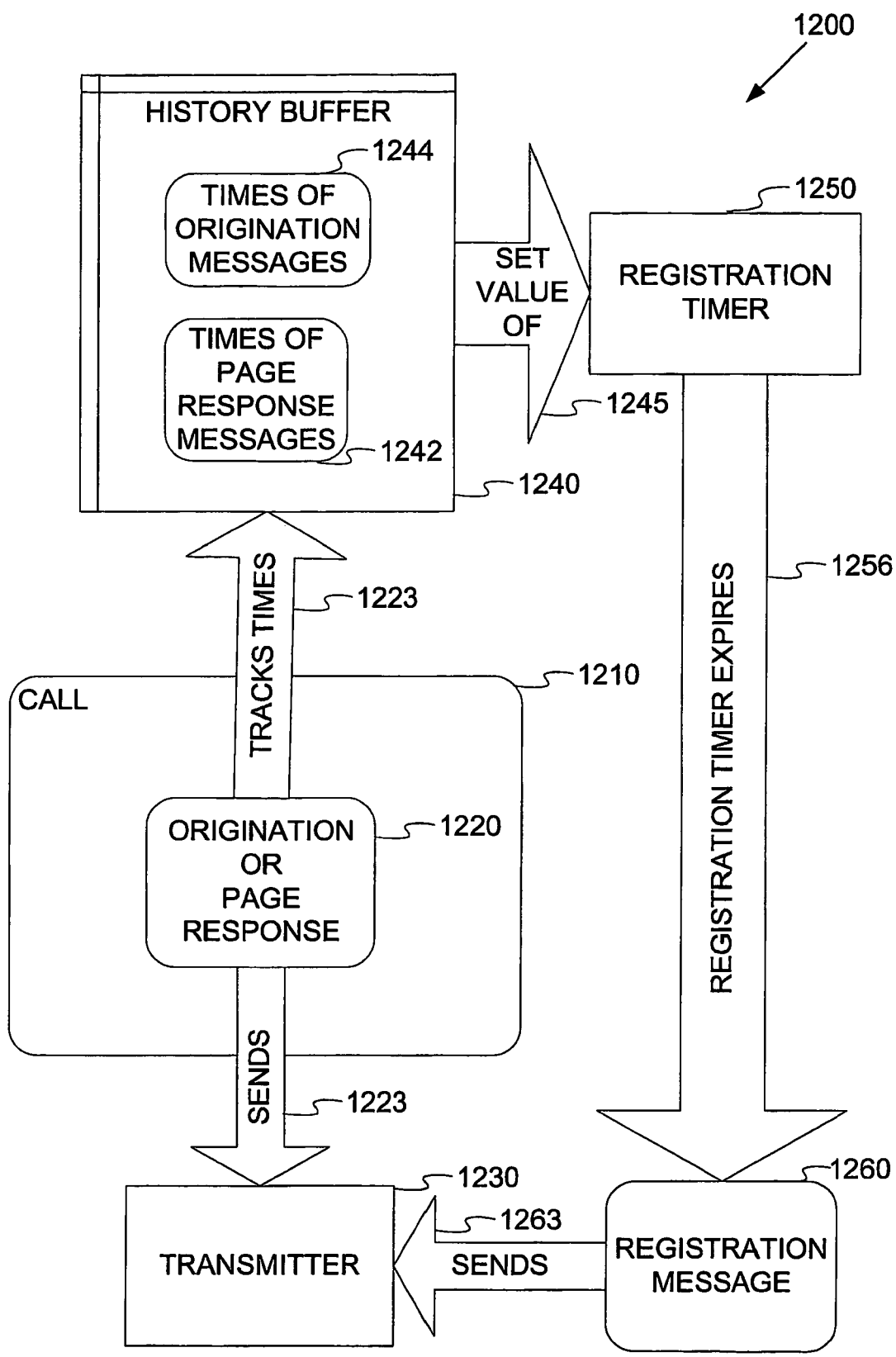
FIG. 12 is a block diagram illustrating an embodiment of an apparatus provided in accordance with the invention.

Referring now to FIG. 12, FIG. 12 is a block diagram illustrating an embodiment of an apparatus provided in accordance with the invention. The apparatus 1200 includes a history buffer 1240, a registration timer 1250, and a transmitter 1230. The apparatus 1200 is provided at a mobile station such that, when a call 1210 sends an origination or a page response message, the history buffer 1240 tracks times 1223 of the origination or page response 1220 so that history buffer 1240 contains the times of origination messages 1244 and the times of page messages 1242. The history buffer 1230 is then used to set value of a registration timer 1250, at step 1245. When the registration timer expires at step 1256, the apparatus sends a registration message 1260, at step 1263. The apparatus advantageously sets the registration timer value based on the entries in the history buffer so timer-based registrations that are not needed are not sent.

Although not explicitly illustrated, alternative techniques to a simple array are envisaged in order to provide an efficient history buffer. For example a head and a tail pointer can be used to keep track of the location of the newest entry and the oldest entry respectively in history buffer 600. The head is incremented prior to adding the newest entry, whereas the tail is incremented upon removing the oldest entry. If a pointer is incremented past the last element of the history buffer, it is simply wrapped back to the first entry in the history buffer. In this fashion, it is not necessary to actually shift the entries in the history buffer, nor is it necessary to actually have to delete entries in the history buffer. Furthermore, if while incrementing the head pointer it becomes equal to the tail pointer, then a larger history buffer could be allocated and all values copied to it in order to avoid overflow.

The above-described embodiments are intended to be examples only of the invention. Those of ordinary skill in the art may envisage alterations, modifications and variations to the described embodiments which do not depart from the scope of the invention, as defined by the appended claims.

We claim:

1. A method of timer-based registration comprising the steps of:
    maintaining a history of time instances of implicit registrations transmitted by a mobile station over a communications network; and
    if an elapsed time between a pair of successive ones of the time instances in the history is not less than a registration period with the network, initiating a timer-based registration of the mobile station with the communications network after the expiry of a random time value less than the registration period, and otherwise initiating the timer-based registration after the expiry of a time period equal to the registration period.

2. The method according to claim 1, wherein the step of initiating a timer-based registration further comprises initiating the timer-based registration after the expiry of the random time value if a duration of a communication with the mobile station over the communications network is at least twice the registration period.

3. The method according to claim 1, wherein the step of initiating a timer-based registration further comprises initiating the timer-based registration after the expiry of the time period if a duration of a communication with the mobile station over the communications network exceeds the registration period.

4. The method according to claim 1, wherein the step of maintaining a history of time instances comprises the steps of:
    (a) recording in the history a new time entry comprising the time instance of a last one of the implicit registrations, and
    (b) where a duration of a communication with the mobile station over the communications network is greater than the registration period, (i) calculating an incremental time greater than the time of the new time entry, and (ii) recording in the history an additional time entry comprising the incremental calculated time.

5. The method according to claim 4, wherein the incremental time comprises the registration period greater than the time of the new time entry.

6. The method according to claim 5, wherein the step of recording a new time entry comprises the step of: over the new time entry recording the time
    instance of a new one of the implicit registrations, where a time lag between the time instance of the implicit registration preceding the last one implicit registration and the time instance of the new one implicit registration is less than the registration period.

7. The method according to claim 6, wherein the time instance of each said implicit registration comprises an acknowledgement time of a return acknowledgement received from the communications network in response to the associated implicit registration.

8. The method according to claim 1, wherein the maintaining step comprises maintaining the history at the mobile station.

9. The method according to claim 1, wherein the implicit registrations comprise one of origination messages and page response messages.

10. The method according to claim 1, wherein the step of initiating a timer-based registration after the expiry of a random time value comprises the steps of receiving a network parameter at the mobile station, and generating the random time value based on the received network parameter.

11. The method according to claim 10, wherein the step of generating the random time value comprises the steps of calculating a pseudo-random number from a cyclic pseudo-random number generator, and applying a time offset to the calculated pseudo-random number based on the received network parameter.

12. A timer-based registration apparatus provided at a mobile station, the apparatus comprising:
    a registration timer;
    a history buffer
    maintaining means for maintaining in the history buffer a history of time instances of implicit registrations transmitted by the mobile station over a communications network;
    setting means for setting an initial count value in the registration timer, the count value being a random time value less than a registration period with the network if an elapsed time between a pair of successive ones of the time instances in the history is not less than the registration period, the count value otherwise being a time period equal to the registration period; and
    registration means for initiating registration of the mobile station with the communications network upon expiry of the registration timer.

13. The timer-based registration apparatus according to claim 12, wherein the setting means is configured to set the count value to the random time value if a duration of a communication with the mobile station over the communications network is at least twice the registration period.

14. The timer-based registration apparatus according to claim 12, wherein the setting means is configured to set the count value to the time period if a duration of a communication with the mobile station over the communications network exceeds the registration period.

15. The timer-based registration apparatus according to any one of claim 12, wherein the maintaining means is configured to maintain the history of time instances by:
    (a) recording in the history buffer a new time entry comprising the time instance of a last one of the implicit registrations, and
    (b) where a duration of a communication with the mobile station over the communications network is greater than the registration period, (i) calculating an incremental time greater than the time of the new time entry, and (ii) recording in the history buffer an additional time entry comprising the incremental calculated time.

16. The timer-based registration apparatus according to claim 15, wherein the incremental time comprises the registration period greater than the time of the new time entry.

17. The timer-based registration apparatus according to claim 16, wherein the maintaining means is configured to record the new time entry by: over the new time entry recording the time instance of a new one of the implicit registrations, where a time lag between the time instance of the implicit registration preceding the last one implicit registration and the time instance of the new one implicit registration is less than the registration period.

18. The timer-based registration apparatus according to claim 12, wherein the setting means is configured to generate the random time value from a network parameter received at the mobile station.

19. The timer-based registration apparatus according to claim 18, wherein the setting means is configured to generate the random time value by calculating a pseudo-random number from a cyclic pseudo-random number generator, and applying a time offset to the calculated pseudo-random number based on the received network parameter.

20. A computer-readable medium carrying computer processing instructions which, when executed by a computer processor, cause performance of the steps of:
maintaining a history of time instances of implicit registrations transmitted by a mobile station over a communications network; and
if an elapsed time between a pair of successive ones of the time instances in the history is not less than a registration period with the network, initiating a timer-based registration of the mobile station with the communications network after the expiry of a random time value less than the registration period, and otherwise initiating the timer-based registration after the expiry of a time period equal to the registration period.

21. A method of timer-based registration provided at a mobile station, the method comprising the steps of:
at the mobile station receiving a randomization parameter over a communications network while the mobile station is registered with the network; and
initiating a timer-based registration of the mobile station with the communications network after expiry of a random time value bounded by a registration period with the network and a lower registration delay time limit, the lower registration delay time limit being less than the registration period and being determined from the randomization parameter.

22. The method according to claim 21, wherein the random time value is determined by initializing a count value of a counter with a pseudo-random number generated from a cyclic pseudo-random number generator, an upper limit of the pseudo-random number being a function of the randomization parameter.

23. The method according to claim 21, further comprising:
maintaining a history of time instances of implicit registrations transmitted by the mobile station over the communications network; and
if an elapsed time between a pair of successive ones of the time instances in the history is not less than a registration period with the network, the timer-based registration step comprises initiating the registration after the expiry of the random time value, and otherwise the timer-based re-registration step comprises initiating the re-registration after the expiry of a time period equal to the registration period.

24. The method according to claim 23, wherein the step of initiating registration further comprises initiating the registration after the expiry of the random time value if a duration of a communication with the mobile station over the communications network is at least twice the registration period.

25. The method according to claim 23, wherein the timer-based registration step further comprises initiating the registration after the expiry of the time period if a duration of a communication with the mobile station over the communications network exceeds the registration period.

26. The method according to claim 21, further comprising maintaining a history of time instances of implicit registrations transmitted by the mobile station over the communications network, the history maintaining step comprising the steps of:

(a) recording in the history a new time entry comprising the time instance of a last one of the implicit registrations, and
(b) where a duration of a communication with the mobile station over the communications network is greater than the registration period, (i) calculating an incremental time greater than the time of the new time entry, and (ii) recording in the history an additional time entry comprising the incremental calculated time.

27. The method according to claim 26, wherein the step of recording a new time entry comprises the step of: over the new time entry recording the time instance of a new one of the implicit registrations, where a time lag between the time instance of the implicit registration preceding the last one implicit registration and the time instance of the new one implicit registration is less than the registration period.

28. A timer-based registration apparatus provided at a mobile station, the apparatus comprising:
a registration timer;
receiving means for receiving a randomization parameter over a communications network while the mobile station is registered with the network;
assigning means for calculating a random count value and for initializing the registration timer with the random count value, the random count value causing the registration timer to expire after a random time value bounded by a registration period with the network and a lower registration delay time limit, the lower registration delay time limit being less than the registration period and being determined from the randomization parameter; and
registration means for initiating registration of the mobile station with the communications network after expiry of the random time value.

29. The timer-based registration apparatus according to claim 28, wherein the assigning means comprises a cyclic pseudo-random number generator configured for generating a pseudo-random number, and calculating means for deriving the random count value from the pseudo-random number, an upper limit of the random count value being a function of the randomization parameter.

30. The timer-based registration apparatus according to claim 28, further comprising means for maintaining a history of time instances of implicit registrations transmitted by the mobile station over the communications network; and,
the registration means is configured such that if an elapsed time between a pair of successive ones of the time instances in the history is not less than a registration period with the network, the registration means initiates the re-registration after the expiry of the random time value, and otherwise the registration means initiates the re-registration after the expiry of a time period equal to the registration period.

31. The timer-based registration apparatus according to claim 30, wherein the registration means is further configured to initiate the registration after the expiry of the random time value if a duration of a communication with the mobile station over the communications network is at least twice the registration period.

32. The timer-based registration apparatus according to claim 30, wherein the registration means is further configured to initiate the registration after the expiry of the time period if a duration of a communication with the mobile station over the communications network exceeds the registration period.

33. The timer-based registration apparatus according to any claim 28, further comprising means for maintaining a history of time instances of implicit registrations transmitted by the mobile station over the communications network, the history means being configured:

(a) to record in the history a new time entry comprising the time instance of a last one of the implicit registrations; and, (b) where a duration of a communication with the mobile station over the communications network is greater than the registration period, (i) to calculate an incremental time greater than the time of the new time entry, and (ii) to record in the history an additional time entry comprising the incremental calculated time.

34. The timer-based registration apparatus according to claim 33, wherein the step of recording a new time entry comprises the step of: over the new time entry recording the time instance of a new one of the implicit registrations, where a time lag between the time instance of the implicit registration preceding the last one implicit registration and the time instance of the new one implicit registration is less than the registration period.

35. A computer-readable medium carrying computer processing instructions which, when executed by a processing unit of a mobile station, cause the mobile station to perform the steps of:

at the mobile station receiving a randomization parameter over a communications network while the mobile station is registered with the network; and initiating a timer-based registration of the mobile station with the communications network after expiry of a random time value bounded by a registration period with the network and a lower registration delay time limit, the lower registration delay time limit being less than the registration period and being determined from the randomization parameter.

* * * * *